(12) United States Patent
Yu et al.

(10) Patent No.: US 9,469,169 B1
(45) Date of Patent: Oct. 18, 2016

(54) TIRE PRESSURE MONITORING SYSTEM AND RESETTING METHOD THEREOF

(71) Applicant: ORANGE ELECTRONIC CO., LTD., Taichung (TW)

(72) Inventors: Hung-Chih Yu, Taichung (TW); Chang-Sung Lai, Taichung (TW)

(73) Assignee: ORANGE ELECTRONIC CO., LTD., Taichung (TW)

( * ) Notice: Subject to any disclaimer, the term of this patent is extended or adjusted under 35 U.S.C. 154(b) by 0 days.

(21) Appl. No.: 14/664,929

(22) Filed: Mar. 23, 2015

(51) Int. Cl.
   *B60C 23/00* (2006.01)
   *B60C 23/04* (2006.01)
(52) U.S. Cl.
   CPC .................. *B60C 23/0471* (2013.01)
(58) Field of Classification Search
   None
   See application file for complete search history.

(56) References Cited

U.S. PATENT DOCUMENTS

| | | | | |
|---|---|---|---|---|
| 2007/0287396 A1* | 12/2007 | Huang | ..................... | G06F 8/65 455/185.1 |
| 2009/0276102 A1* | 11/2009 | Smith | ................... | A01G 25/167 700/284 |
| 2013/0226403 A1* | 8/2013 | Zhang | ................... | G01M 17/02 701/36 |

* cited by examiner

*Primary Examiner* — Ojiako Nwugo
(74) *Attorney, Agent, or Firm* — CKC & Partners Co., Ltd.

(57) ABSTRACT

A tire pressure monitoring system having a built-in bootloader includes a tire pressure detecting element and an update setting element. The tire pressure detecting element includes a flash memory, wherein the flash memory has a backup bootloader and an inner memory section. The update setting element stores a plurality of reset modules, and each of the reset modules corresponds to the inner memory section, wherein the backup bootloader is started for selecting one of the reset modules to cover the inner memory section.

10 Claims, 7 Drawing Sheets

TIRE PRESSURE MONITORING SYSTEM AND RESETTING METHOD THEREOF

BACKGROUND

1. Technical Field

The present disclosure relates to a tire pressure monitoring system and a resetting method thereof. More particularly, the present disclosure relates to the tire pressure monitoring system having a built-in bootloader and the resetting method thereof.

2. Description of Related Art

In recent years, a vehicle often uses a tire pressure monitoring system to control a tire pressure. The tire pressure monitoring system is quite important for improving the safety of the vehicle. The tires are the only part of the vehicle in direct contact with the road surface. The abnormal tire pressure, in bloated state or in inflated state, not only will affect the energy consumption and operating effect of the vehicle, but also will cause the occurrence of the traffic accident. Therefore, the tire pressure monitoring system has become one of the necessary equipment for the vehicle.

The conventional tire pressure monitoring system is consisted of four main components, a tire pressure detecting element, a receiver, a display equipment and an update setting element. The components installed on the vehicle and operated by driver are the tire pressure detecting element, the receiver and the display equipment. The update setting element is related to the check of the tire pressure detection element, the setting requirements of different types of the vehicles (such as the information of the temperature, pressure and acceleration of the tire), and the signal custom setting of different vehicle models. In addition, the update setting element is set by the original manufacturer or is operated by the maintenance personnel. When the tire pressure detecting element is set to the correct setting by the update setting element, the tire pressure detecting element emits the high-frequency data signal to the receiver. The receiver transmits this information to the display equipment; hence the driver can keep the real-time information of the tire pressure status through the display equipment.

In the past, the update setting element was set by the original manufacturer or was operated by the maintenance personnel. The setting or the operation of the update setting element will not fail due to lack of experience. Nevertheless, the setting requirements of the vehicle and the tire pressure are not altered at a flash memory in the a micro control unit of the tire pressure detecting element, and an initiation region of the flash memory is prohibited performing the writing process for the function and the low cost consideration and preventing the setting of a boot block is modified. Therefore, the technology of the current tire pressure detecting element is not allowed to update a bootloader at an initiation zone. Further, a basic input-output system or related setting values of the bootloader are changed with upgrades of the vehicle types and the vehicles models. Conventional practices are initializing memory to modify the bootloader when the basic input-output system or the related setting values of the bootloader do not match to hardware of the new vehicle. However, the mechanism that a reset processing can only be written after the memory initialization in the conventional practice causes inconvenience to the original manufacturer setting or the maintenance personnel. Except a repair returned to the original manufacturer, there is no easy way to update the flash memory without a limitation of the bootloader at the initiation zone. Hence, conventional products can not conveniently update the settings of the flash memory to follow the changes of the vehicle type or the vehicle model and other setting modified requirements

SUMMARY

According to one aspect of the present disclosure, a tire pressure monitoring system having a built-in bootloader is provided. The tire pressure monitoring system having the built-in bootloader includes a tire pressure detecting element. The tire pressure detecting element includes a flash memory which has a backup bootloader and an inner memory section, and the inner memory section has a default module and a major bootloader for starting the default module, wherein the backup bootloader resets the inner memory section by covering the default module with a reset module, and a new major bootloader associated with the reset module is generated by the reset module.

According to another aspect of the present disclosure, a tire pressure monitoring system having a built-in bootloader is provided. The tire pressure monitoring system having the built-in bootloader includes a tire pressure detecting element and an update setting element. The tire pressure detecting element includes a flash memory, wherein the flash memory has a backup bootloader and an inner memory section, and the inner memory section has a default module and a major bootloader for starting the default module. The update setting element stores a plurality of reset modules, each reset module individually corresponds to the inner memory section, and one of the reset modules is selected to cover the default module, wherein the backup bootloader is started for selecting one of the reset modules to cover the default module of the inner memory section, and a new major bootloader associated with the reset module is generated by the reset module.

According to still another aspect of the present disclosure, a resetting method of a tire pressure monitoring system having a built-in bootloader for resetting a tire pressure detecting element includes steps as follows. A built-in memory step is provided, wherein a backup bootloader and a major bootloader are installed in a flash memory of the tire pressure detecting element, and a default module is installed in an inner memory section of the flash memory. An installing reset module step is provided, wherein a plurality of reset modules are installed in an update setting element. A connecting step is provided, wherein the tire pressure detecting element is connected with the update setting element. A cleaning step is provided, wherein the default module and the major bootloader are deleted by the update setting element. A resetting step is provided, wherein the backup bootloader is started for selecting one of the reset modules to cover the default module of the inner memory section, and a new major bootloader associated with the reset module is generated by the reset module.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
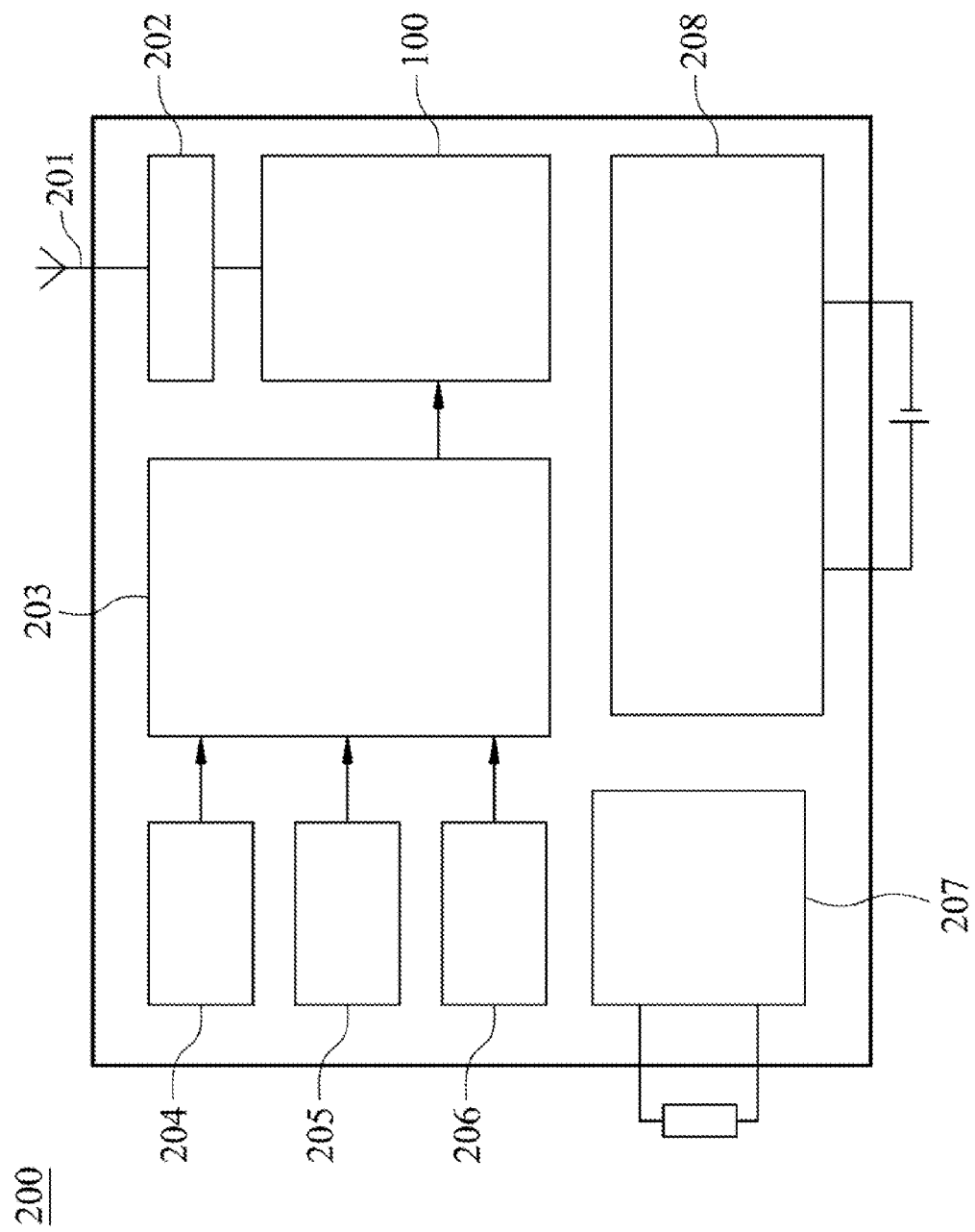
FIG. 1 is a structural diagram showing a tire pressure monitoring system having a built-in bootloader according to one embodiment of the present disclosure.

FIG. 1 is a structural diagram showing a tire pressure monitoring system having a built-in bootloader according to one embodiment of the present disclosure. In FIG. 1, the tire pressure monitoring system having the built-in bootloader includes a tire pressure detecting element 200.

The tire pressure detecting element 200 includes a flash memory 100, a first antenna 201, a radio frequency transmitter 202, a preprocessor 203, a pressure sensor 204, a temperature sensor 205, an acceleration sensor 206, a low frequency front-end input port 207 (125 kHz) and a power controller 208. The power controller 208 can manage an internal power supply or an external power supply. The flash memory 100 has a backup bootloader 110 which is not altered and an inner memory section 120. The inner memory section 120 has a default module, wherein the default module includes a firmware program and data settings. The low frequency front-end input port 207 can search outside signal. The pressure sensor 204, the temperature sensor 205 and the acceleration sensor 206 transmit sensing results to the preprocessor 203, and the preprocessor 203 integrates the sensing results and then transmits integrated information to the flash memory 100. The flash memory 100 uses the firmware program to process the integrated information, and the flash memory 100 outputs detection information through the first antenna 201 and the radio frequency transmitter 202.

In addition, the inner memory section 120 has a reset module. The reset module covers the default module by the backup bootloader. Therefore, the users can start the backup bootloader 110 to cover the default module with the reset module for resetting the inner memory section 120 when the users need to reset the firmware program and the data settings of the flash memory 100. Then the reset module covers the default module, and the tire pressure detecting element 200 is reset.

Figure 2:
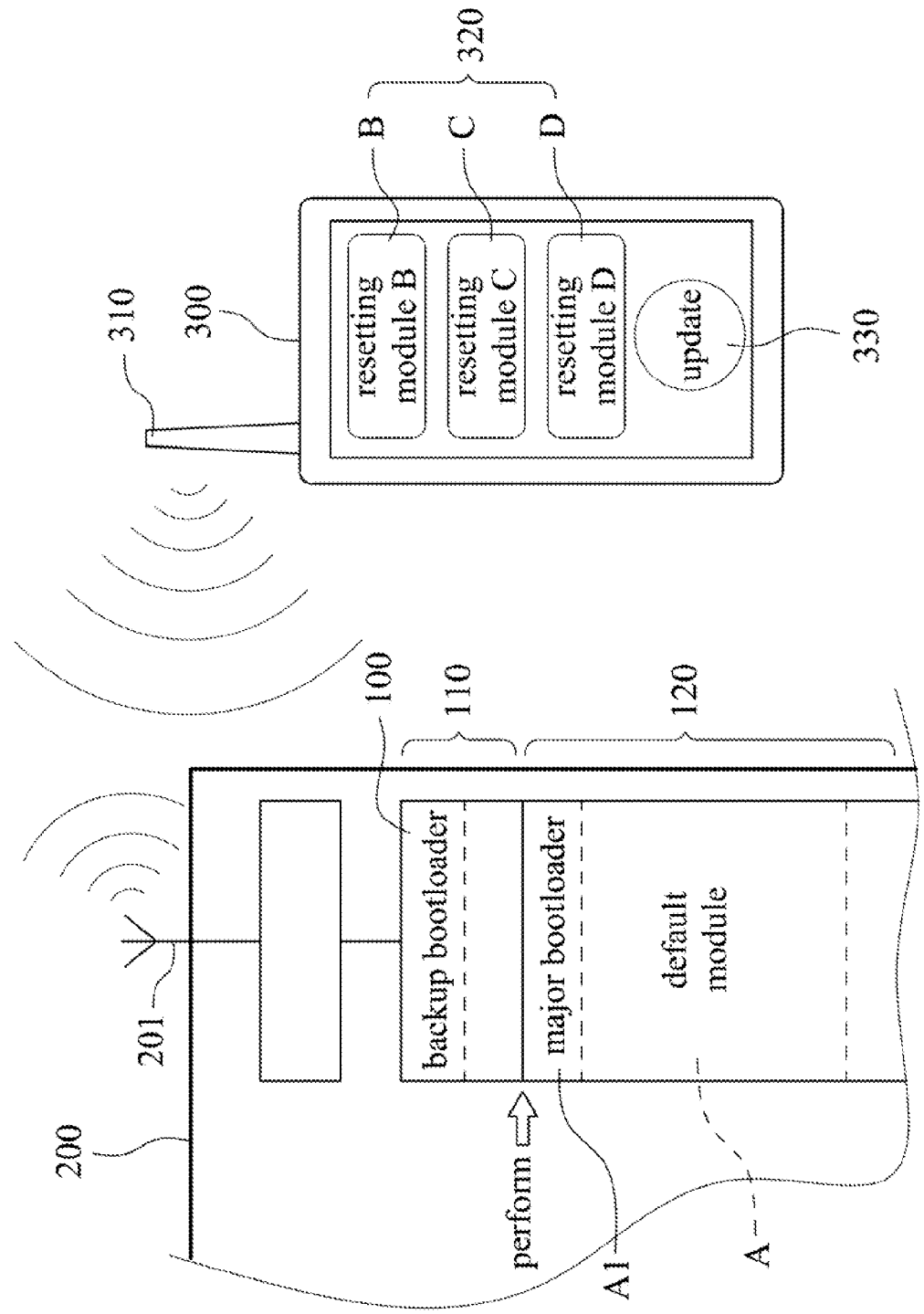
FIG. 2 is a schematic diagram showing the tire pressure monitoring system having the built-in bootloader before a resetting according to another embodiment of the present disclosure.
Figure 3:
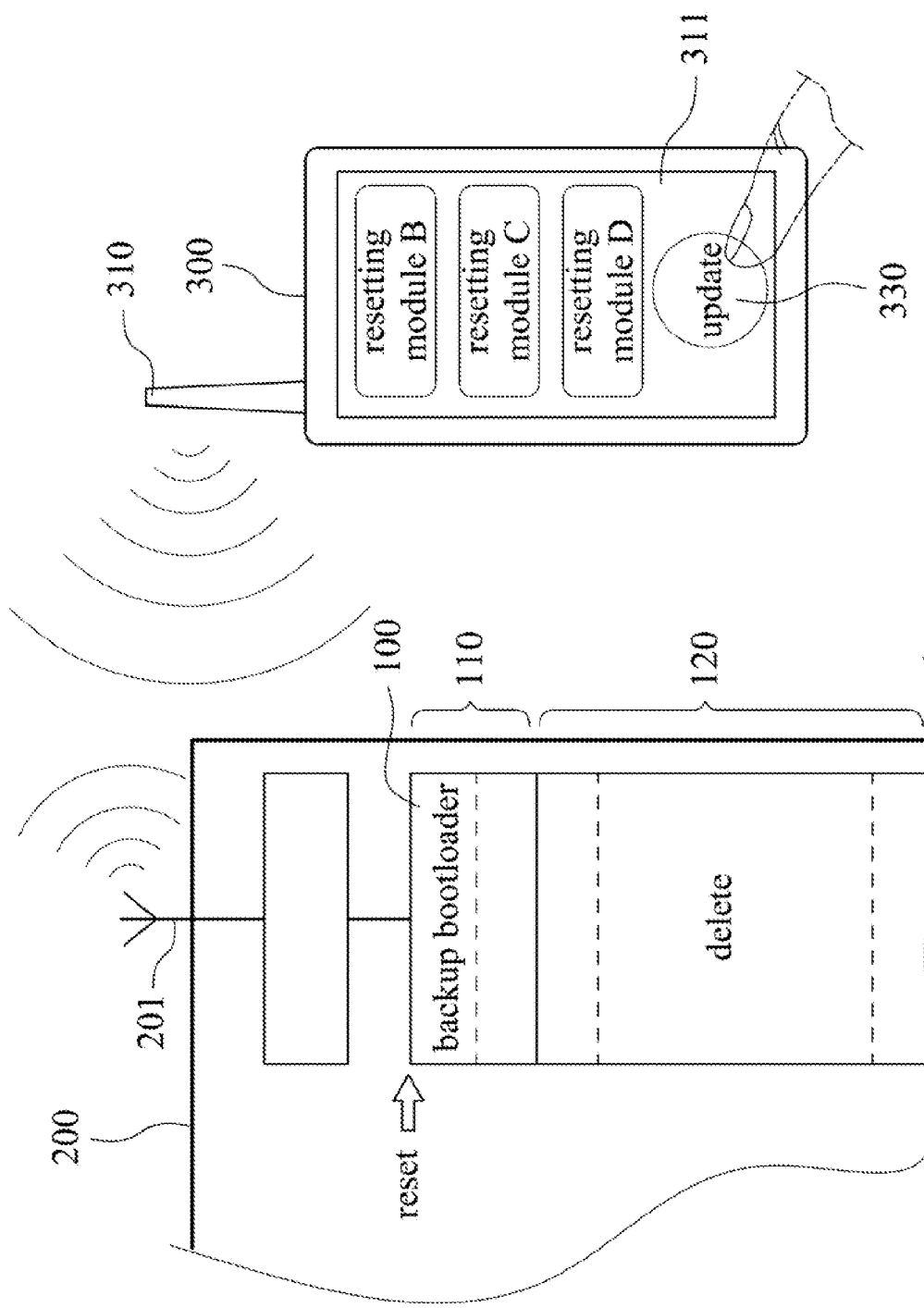
FIG. 3 is a schematic diagram showing the tire pressure monitoring system having the built-in bootloader which is performed the resetting according to another embodiment of the present disclosure.
Figure 4:
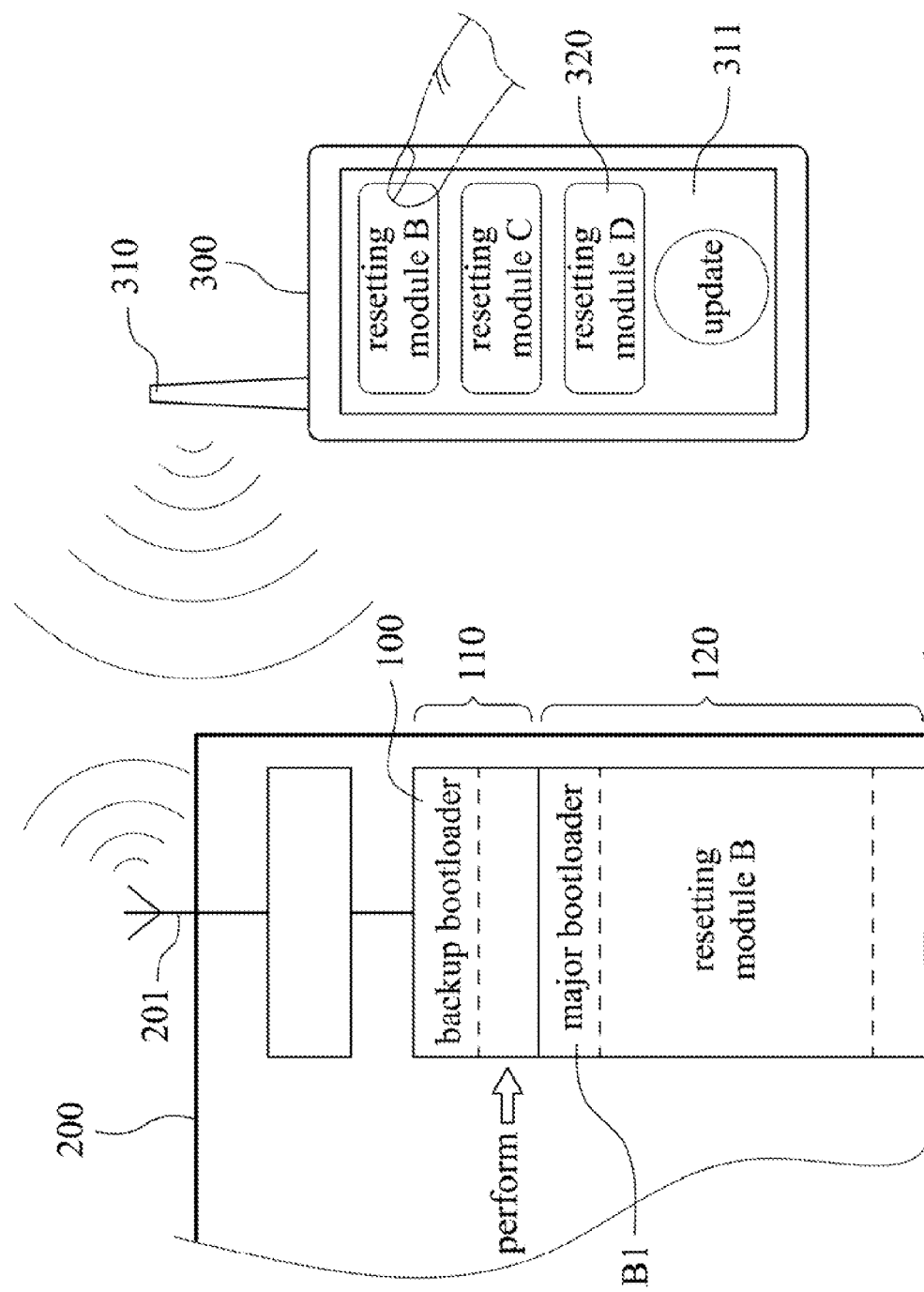
FIG. 4 is a schematic diagram showing the tire pressure monitoring system having the built-in bootloader after the resetting according to another embodiment of the present disclosure.
Figure 5:
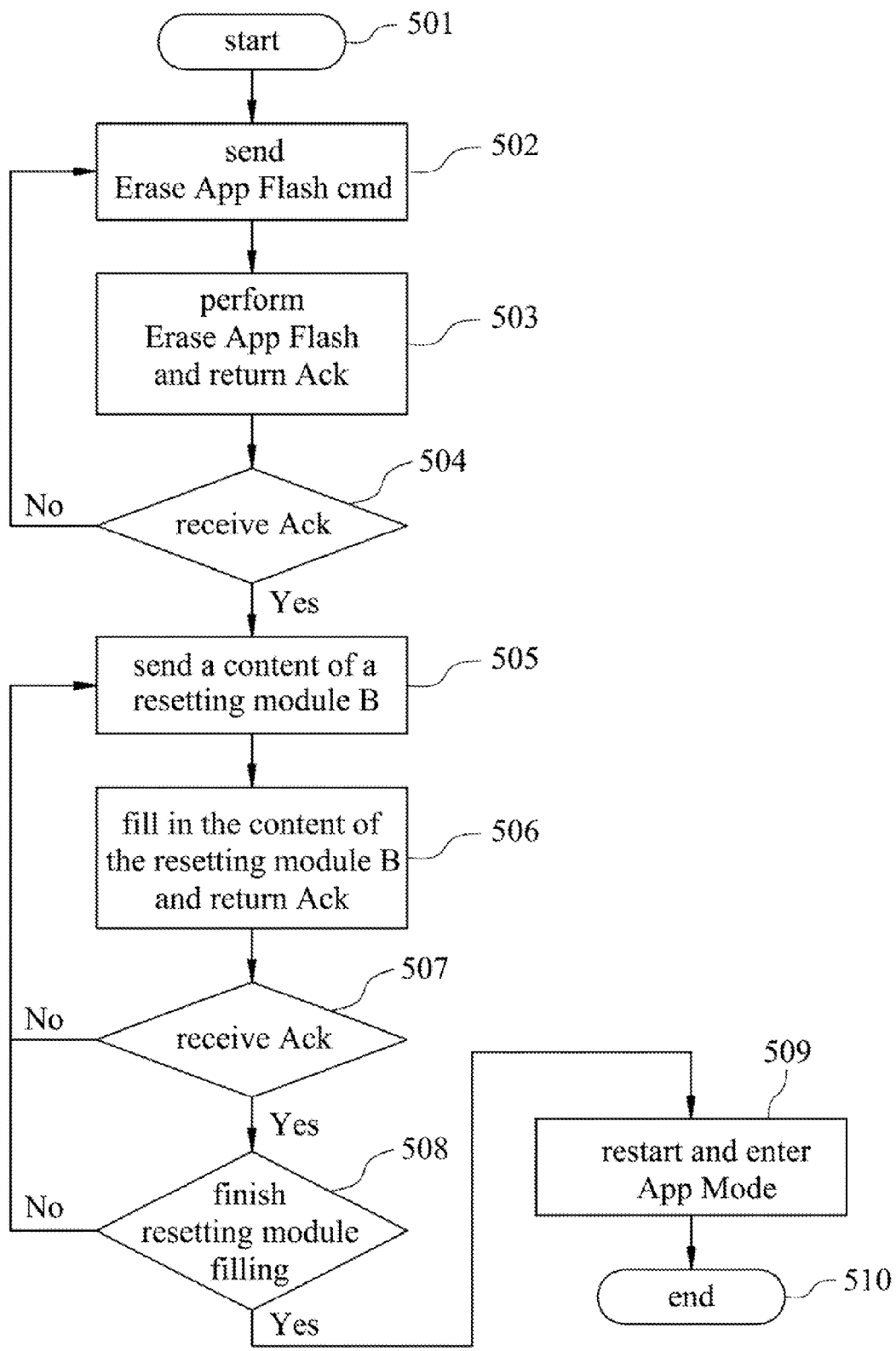
FIG. 5 is a flow chart showing an operation of the tire pressure monitoring system having the built-in bootloader according to another embodiment of the present disclosure.

FIG. 2 is a schematic diagram showing the tire pressure monitoring system having the built-in bootloader before a resetting according to another the embodiment of the present disclosure. FIG. 3 is a schematic diagram showing the tire pressure monitoring system having the built-in bootloader which is performed the resetting according to the embodiment of FIG. 2. FIG. 4 is a schematic diagram showing the tire pressure monitoring system, having the built-in bootloader after the resetting according to the embodiment of FIG. 2. FIG. 5 is a flow chart showing an operation of the tire pressure monitoring system having the built-in bootloader according to the embodiment of FIG. 2. In FIGS. 2, 3, 4 and 5, the tire pressure monitoring system having the built-in bootloader includes a tire pressure detecting element 200 and an update setting element 300.

The structural diagram of the tire pressure detecting element 200 in the embodiment of FIG. 2 is same as FIG. 1. The tire pressure detecting element 200 includes a flash memory 100, a first antenna 201, a radio frequency transmitter 202, a preprocessor 203, a pressure sensor 204, a temperature sensor 205, an acceleration sensor 206, a low frequency front-end input port 207 (125 kHz) and a power controller 208. The power controller 208 can manage an internal power supply or an external power supply. The flash memory 100 has a backup bootloader 110 which is not altered and an inner memory section 120. The inner memory section 120 has a default module A, wherein the default module A includes a firmware program and data settings. The low frequency front-end input port 207 can search outside signal. The pressure sensor 204, the temperature sensor 205 and the acceleration sensor 206 transmit sensing results to the preprocessor 203, and the preprocessor 203 integrates the sensing results and then transmits integrated information to the flash memory 100. The flash memory 100 uses the firmware program to process the integrated information, and the flash memory 100 outputs detection information through the first antenna 201 and the radio frequency transmitter 202.

The update setting element 300 includes a second antenna 310 and an operation panel 311, wherein the operation panel 311 has a program operation interface. A command (cmd) option of the program operation interface includes three module buttons 320 and an update button 330. The module buttons 320 and the update button 330 can be virtual buttons of an application program on the operation panel 311 (touch panel), or conventional physical buttons. The update setting element 300 stores three reset modules, which are the reset module B, the reset module C and the reset module D. The reset module B, the reset module C and the reset module D are corresponding set to the three module buttons 320. In addition, the reset module B, the reset module C and the reset module D correspond to the inner memory section 120 of the flash memory 100. The update setting element 300 can be selected one of the reset modules B, C or D to cover the default module A of the inner memory section 120 through starting the backup bootloader 110.

In FIG. 2, users do not need to use the updated setting element 300 when they perform a general operation of the tire pressure monitoring system. The tire pressure detecting element 200 is disposed in the inside of a tire or disposed on an air valve of the tire. The pressure sensor 204, the temperature sensor 205 and the acceleration sensor 206 transmit the sensing results to the preprocessor 203, and the preprocessor 203 integrates the sensing results and then transmits the integrated information to the flash memory 100. The flash memory 100 is entered by performing a major bootloader A1 of the default module A. Next, the flash memory 100 uses the firmware program of the default module A to process the integrated information. Then, flash memory 100 outputs detection information through the first antenna 201 and radio frequency transmitter 202. The tire pressure monitoring system usually is cooperated with a display equipment (not shown) inside the vehicle for collecting and displaying the detection information. The display equipment is a conventional practice, and will not describe herein.

In FIGS. 3 and 5, first in step 501, the users start a connection between the tire pressure detecting element 200 and the update setting element 300 when the users need to reset the firmware program and the data settings of the flash memory 100. The connection can be a wireless connection via the second antenna 310 of the update setting element 300. Next in step 502 and step 503, the users can press the update button 330 to send an Erase App Flash cmd for deleting the default module A stored in the flash memory 100, and the major bootloader A1 of the default module A is deleted simultaneously; hence the inner memory section 120 is become blank. Then the tire pressure detecting element 200 returns acknowledgement (Ack) to the update setting element 300. In step 504, the update setting element 300 goes to next step by confirming the Ack is received. Otherwise, the update setting element 300 resends the Erase App Flash cmd to the tire pressure detecting element 200.

If the update setting element 300 receives the Ack, it indicates that the default module A and the major bootloader A1 are deleted. Accordingly in step 505, the users can use one of the module buttons 320 to select the reset module B, the reset module C or the reset module D, and then press the update button 330. The three module buttons 320 and the update button 330 are the virtual buttons of the application program on the operation panel 311. For example, the users select the reset module B, and a content of the reset module B is transmitted to the flash memory 100 of the tire pressure detecting element 200 by starting the backup bootloader 110. Then in step 506, the reset module B is conveniently reset in the inner memory section 120; meanwhile, a major bootloader B1 of the reset module B is generated. Next, the tire pressure detecting element 200 returns the Ack to the update setting element 300. In step 507, the update setting element 300 goes to next step by confirming the Ack is received. Otherwise, the update setting element 300 resends the content of the reset module B to the tire pressure detecting element 200.

In step 508, if the update setting element 300 receives the Ack, it indicates that the reset module B covers the default module A and the major bootloader B1 is generated. In step 509, the tire pressure detecting element 200 is restarted and recovered by the major bootloader B1 and then enters the App Mode of the reset module B. Finally in step 510, the tire pressure detecting element 200 is reset by aforementioned process. The tire pressure detecting element 200 continuously uses the major bootloader B1 to start the reset module B in the future operation. The tire pressure monitoring system having a built-in bootloader of the present disclosure can conveniently set internal information and reset the firmware program according to the aforementioned embodiment. Because of a cooperation of the backup bootloader 110, the users no longer needs to return their vehicle to original manufacturer for repairing or resetting the tire pressure detecting element 200 via a complex update operation. No matter how the system and data of the vehicle are changed in the future, the users can easily use the reset modules to reset the tire pressure detecting element 200. The users do not need to worry about the operation failed to cause a bootloader deleted accidentally. Therefore, the present disclosure can indeed solve the long-standing resetting problem in the tire pressure monitoring system area.

Furthermore, the second antenna 310 of the update setting element 300 is a signal transmitting end group for a wireless signal connection in this embodiment. The second antenna 310 can be produced as a signal alignment. The signal alignment can be a burning end group for a wired connection between the tire pressure detecting element 200 and the update setting element 300.

Figure 6:
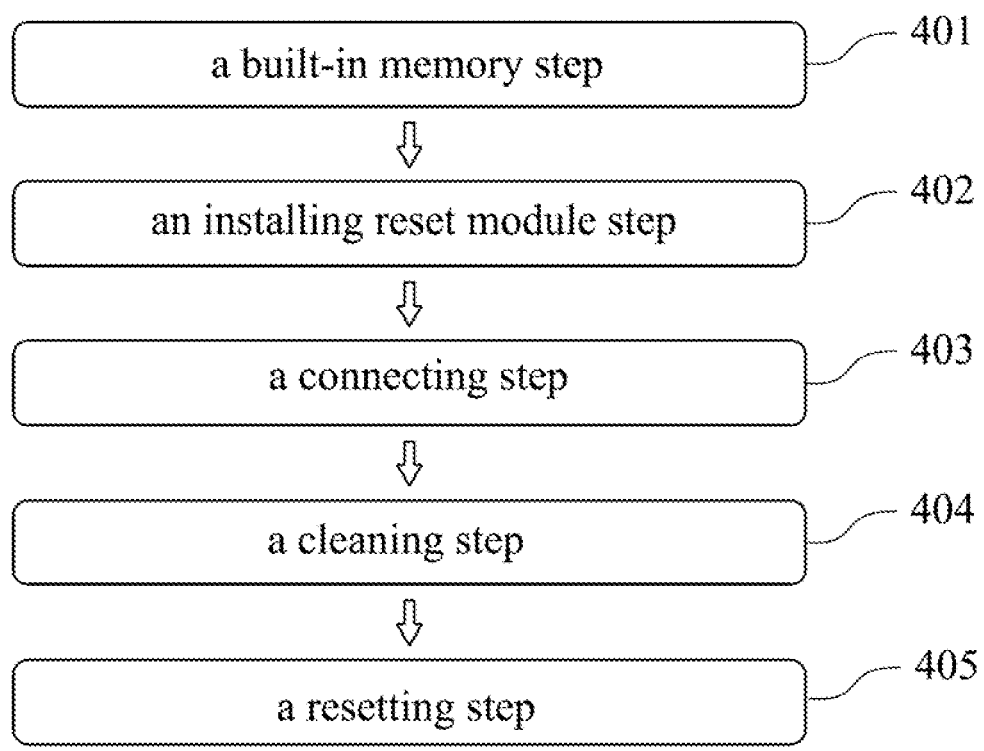
FIG. 6 is a flow diagram showing a resetting method of the tire pressure monitoring system having the built-in bootloader for resetting a tire pressure detecting element according to still another embodiment of the present disclosure.

FIG. 6 is a flow diagram showing a resetting method of the tire pressure monitoring system having the built-in bootloader for resetting a tire pressure detecting element according to another embodiment of the present disclosure. In FIG. 6, the resetting method of the tire pressure monitoring system having the built-in bootloader for resetting a tire pressure detecting element includes a built-in memory step 401, an installing reset module step 402, a connecting step 403, a cleaning step 404 and a resetting step 405.

The built-in memory step 401 is provided, wherein the backup bootloader 110 is installed in the flash memory 100 of the tire pressure detecting element 200, and the default module A is installed in the inner memory section 120 of the flash memory 100. The installing reset module step 402 is provided, wherein a plurality of reset modules are installed in the update setting element 200. The connecting step 403 is provided, wherein the tire pressure detecting element 200 is connected with the update setting element 300. The cleaning step 404 is provided, wherein the default module A is deleted by the update setting element 300. Finally, the resetting step 405 is provided, wherein the backup bootloader 110 is started for selecting one of the reset modules to cover the default module A of the inner memory section 120.

Figure 7:
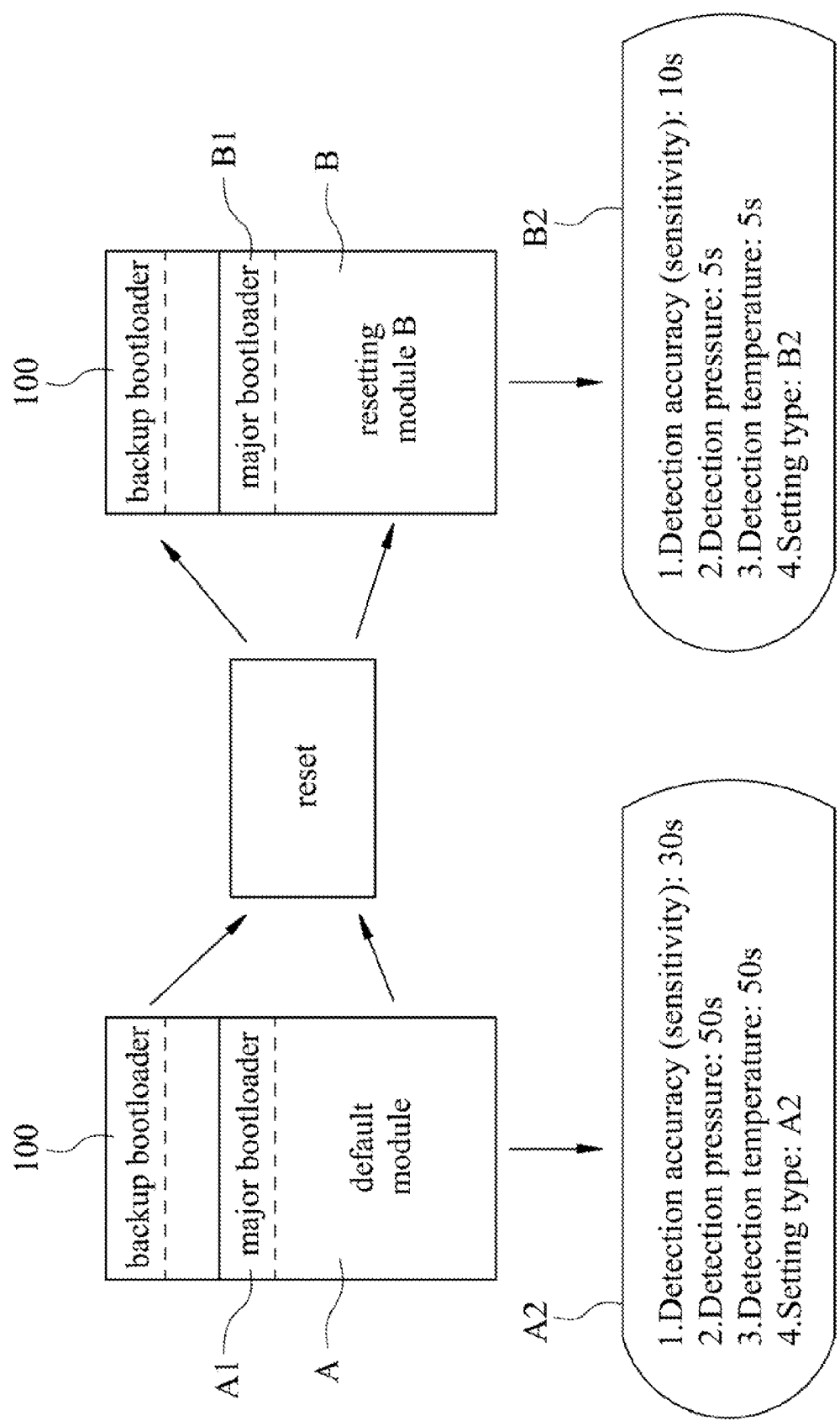
FIG. 7 is a schematic diagram showing statuses before the update setting and after the update setting of the tire pressure monitoring system of the present disclosure.

FIG. 7 is a schematic diagram showing statuses before the update setting and after the update setting of the tire pressure monitoring system of the present disclosure. The users can select the reset module B to cover the default module A of the inner memory section 120 by starting the backup bootloader 110 in the resetting step 405. The reset module B burns a firmware program B2 to cover the firmware program A2 after the resetting step. The firmware program to perform the tire pressure detecting element 200 is replaced the firmware program A1 of the default module A with the firmware program B2 of the reset module B. For example, a setting time of a detection accuracy (sensitivity), a detection pressure and a detection temperature in the default module A is 30 seconds, 50 seconds and 50 seconds, respectively. After resetting, the setting time of the tire pressure detecting element 200 is changed to the value of the reset module B, wherein the setting time of the detection accuracy (sensitivity), the detection pressure and the detection temperature in the reset module B is 10 seconds, 5 seconds and 5 seconds, respectively.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A tire pressure monitoring system having a built-in bootloader, comprising:
   a tire pressure detecting element comprising a flash memory, wherein the flash memory has a backup bootloader and an inner memory section, and the inner memory section has a default module and a major bootloader for starting the default module; and
   an update setting element, wherein the update setting element stores a plurality of reset modules, each reset module individually corresponds to the inner memory section, and one of the reset modules is selected to cover the default module;
wherein the backup bootloader is started for selecting one of the reset modules to cover the default module of the inner memory section, and a new major bootloader associated with the reset module is generated by the reset module.

2. The tire pressure monitoring system having the built-in bootloader of claim 1, wherein the tire pressure detecting element further comprises a pressure sensor, a temperature sensor or an acceleration sensor, and the pressure sensor, the temperature sensor or the acceleration sensor is signally connected to the flash memory.

3. The tire pressure monitoring system having the built-in bootloader of claim 1, wherein each of the reset modules has a firmware program.

4. A resetting method of a tire pressure monitoring system having a built-in bootloader for resetting a tire pressure detecting element, comprising:
providing a built-in memory step, wherein a backup bootloader is installed in a flash memory of the tire pressure detecting element, and a default module and a major bootloader are installed in an inner memory section of the flash memory;
providing an installing reset module step, wherein a plurality of reset modules are installed in an update setting element;
providing a connecting step, wherein the tire pressure detecting element is connected with the update setting element;
providing a cleaning step, wherein the default module and the major bootloader are deleted by the update setting element; and
providing a resetting step, wherein the backup bootloader is started for selecting one of the reset modules to cover the default module of the inner memory section, and a new major bootloader associated with the reset module is generated by the reset module.

5. The resetting method of the tire pressure monitoring system having the built-in bootloader for resetting the tire pressure detecting element of claim 4, wherein the reset module burns a firmware program in the inner memory section after the resetting step.

6. A tire pressure monitoring system having a built-in bootloader, comprising:
a tire pressure detecting element, wherein the tire pressure detecting element comprises a flash memory which has a backup bootloader and an inner memory section, and the inner memory section has a default module and a major bootloader for starting the default module,
wherein the backup bootloader resets the inner memory section by covering the default module with a reset module, and a new major bootloader associated with the reset module is generated by the reset module.

7. The tire pressure monitoring system having the built-in bootloader of claim 6, wherein the tire pressure detecting element further comprises a pressure sensor, a temperature sensor or an acceleration sensor, and the pressure sensor, the temperature sensor or the acceleration sensor is signally connected to the flash memory.

8. A resetting method for a tire pressure detecting element having a flash memory, the flash memory including an unalterable backup bootloader and a rewritable inner memory section, wherein the inner memory section includes a default module for processing sensing signals, and a major bootloader for starting the default module, the resetting method comprising:
in response to receiving a command, deleting the default module and the major bootloader in the inner memory section of the flash memory;
outputting an acknowledgement after the default module and the major bootloader are deleted;
covering the default module of the inner memory section with a reset module by starting the backup bootloader in the flash memory;
generating a new major bootloader associated with the reset module;
outputting another acknowledgement after the reset module covers the default module and the new major bootloader associated with the reset module is generated; and
using the major bootloader associated with the reset module to start the reset module in future operations.

9. The resetting method of claim 8, further comprising receiving the reset module from an external update setting element which stores the reset module.

10. The resetting method of claim 8, wherein the reset module is stored in a region of the inner memory section, and the reset module is retrieved for covering the default module of the inner memory section.

* * * * *